United States Patent
Eastham

(10) Patent No.: US 7,894,606 B2
(45) Date of Patent: Feb. 22, 2011

(54) SYSTEMS AND METHODS FOR FACILITATING SECURE KEY DISTRIBUTION TO AN EMBEDDED DEVICE

(75) Inventor: Bryant Eastham, Draper, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 1186 days.

(21) Appl. No.: 11/287,886

(22) Filed: Nov. 28, 2005

(65) Prior Publication Data

US 2007/0121949 A1      May 31, 2007

(51) Int. Cl.
*H04L 9/08* (2006.01)

(52) U.S. Cl. .......................... 380/278; 380/44; 380/273; 380/277; 380/280

(58) Field of Classification Search .................. 380/44, 380/278, 273, 277, 280; 705/71
See application file for complete search history.

(56) References Cited

U.S. PATENT DOCUMENTS

| | | | | |
|---|---|---|---|---|
| 4,182,933 A * | 1/1980 | Rosenblum | ................. | 380/279 |
| 4,238,853 A * | 12/1980 | Ehrsam et al. | ................. | 380/45 |
| 4,351,982 A | 9/1982 | Miller et al. | | |
| 4,633,036 A | 12/1986 | Hellman et al. | | |
| 4,933,971 A * | 6/1990 | Bestock et al. | ................. | 380/44 |
| 5,142,579 A | 8/1992 | Anderson | | |
| 5,745,576 A | 4/1998 | Abraham et al. | | |
| 6,711,263 B1 | 3/2004 | Nordenstam et al. | | |
| 2003/0044020 A1 | 3/2003 | Aboba et al. | | |
| 2004/0109567 A1 * | 6/2004 | Yang et al. | ................... | 380/277 |
| 2005/0213768 A1 * | 9/2005 | Durham et al. | ............. | 380/278 |
| 2005/0271207 A1 * | 12/2005 | Frey | ........................... | 380/263 |
| 2006/0005048 A1 * | 1/2006 | Osaki et al. | ................. | 713/193 |
| 2006/0013400 A1 * | 1/2006 | Sutton et al. | ................ | 380/278 |
| 2006/0034456 A1 * | 2/2006 | McGough | ..................... | 380/30 |
| 2006/0080732 A1 * | 4/2006 | Ohkubo et al. | ................. | 726/9 |
| 2007/0083491 A1 * | 4/2007 | Walmsley et al. | .............. | 707/3 |
| 2009/0210701 A1 * | 8/2009 | Zhang et al. | ................ | 713/156 |

FOREIGN PATENT DOCUMENTS

| EP | 0387599 | 9/1990 |
|---|---|---|
| WO | 99/21094 | 4/1999 |

OTHER PUBLICATIONS

Stephen R. Hanna et al., "Configuring Security Parameters in Small Devices", Jan. 2002, IETF Standard-Working-Draft, Internet Engineering Task Force, IETF, CH, XP015001114.

\* cited by examiner

*Primary Examiner*—Kambiz Zand
*Assistant Examiner*—Tongoc Tran
(74) *Attorney, Agent, or Firm*—Austin Rapp & Hardman

(57) ABSTRACT

An embedded program on an embedded device determines whether a security key has been assigned to the embedded device. If the security key has not been assigned, the embedded program uses a random number that is provided by a manufacturer of the embedded device and that is stored in memory of the embedded device to obtain the security key for the embedded device. The security key is stored in the memory of the embedded device. The security key is used to establish secure connections with other devices.

8 Claims, 8 Drawing Sheets

SYSTEMS AND METHODS FOR FACILITATING SECURE KEY DISTRIBUTION TO AN EMBEDDED DEVICE

TECHNICAL FIELD

The present invention relates generally to embedded devices. More specifically, the present invention relates to systems and methods for facilitating secure key distribution to an embedded device.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

Embedded devices may establish connections to other electronic devices for a variety of reasons. For example, an organization may want to make data about its embedded devices available to certain remote clients. However, some of the data that an organization wants to make available to remote clients may be sensitive, i.e., not intended for public disclosure. This data may relate to the operation of the embedded devices themselves. For example, the data may indicate whether an embedded device is turned on, whether it is calibrated correctly, whether a cycle of operation has completed correctly, and so forth. Alternatively, or in addition, this data may relate to something other than the operation of the embedded devices. For example, the data may include a user identifier that corresponds to a user of an embedded device, a measurement taken by an embedded device, an alert generated by an embedded device, and so forth.

Embedded devices may also allow these remote clients to control the behavior of the embedded system. For example, problems found with calibration may be adjustable remotely instead of sending a person to the location of the embedded system. Alternatively, or in addition, the embedded system may allow its behavior to be changed remotely in much the same way it can be changed locally. One example would be locking a door remotely. This kind of remote control is not limited to the functionality available locally, and in many cases may exceed the local capabilities. One example would be a sensor that has no local interface but allows remote control of its behavior.

In view of the foregoing, benefits may be realized by improved mechanisms for securing connections between an embedded device and other devices or clients. Some exemplary systems and methods directed to improving the level of security of such connections are disclosed herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
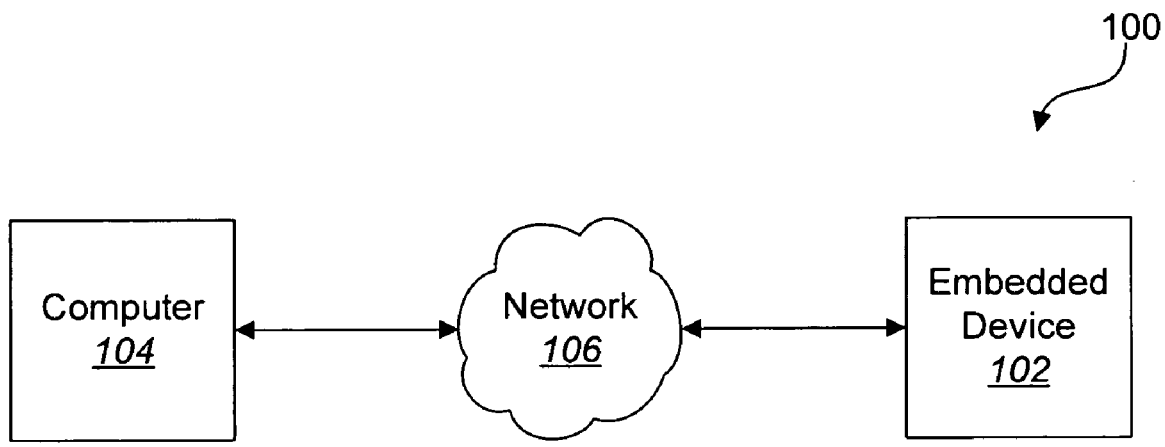
FIG. 1 is a block diagram illustrating a system for facilitating secure key distribution in an embedded device according to an embodiment.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

There are two typical means of security key distribution in use today. The first is public key, the second is shared key. Public key encryption often relies on random numbers to accomplish key distribution. Shared key systems typically require configuration where the key is assigned to the different parties that need to know it. In order to make shared key systems easier to manage, a password or pass-phrase is sometimes used as the key. These low-entropy keys are not very secure, and many methods have been employed to make them more secure. Many of these methods also require random numbers.

Some potential problems may exist when it comes to embedded programs. As indicated above, an embedded program is computer software that runs the processor of an embedded device and tells the processor what to do to carry out certain tasks. Embedded programs typically do not have the ability to generate good random numbers. Using a poor random number generator during key distribution can compromise the entire key, thereby weakening the security of the device for its lifetime. Further, by their nature it is more difficult for an embedded program to configure shared keys as embedded programs typically have limited (or no) user interface capabilities to, for example, copy a key file to them.

Embedded devices may be manufactured in bulk, and their initial programs and configuration may be written to them during this manufacturing process. It is typical for some device-specific information, like a serial number, to be written to the device where it is accessible to the embedded program. While it may be possible to include a shared key among this information, there may be a problem of trust and information storage and transfer if the key is written at that time. First, the manufacturer likely does not want to store the key once the device is manufactured. Second, it is unclear to whom the manufacturer would send the key. Third, the recipient of the device may not trust that the manufacturer did not disclose the key to a third party, either intentionally or inadvertently.

Some other alternatives also exist for security key distribution to an embedded device. For example, a laptop or other computer that doesn't have a problem generating random numbers may be used to assign a security key. Some disadvantages with this approach are that it requires the use of a computer, and also that the secret is transmitted to the embedded device unencrypted by the computer. Yet another alternative is that the embedded device could be augmented with the ability to generate random numbers. However, this is typically costly and may require special hardware. Accordingly, in view of the foregoing, there is a need for improved mechanisms for facilitating security key distribution to embedded devices.

Embodiments disclosed herein relate generally to facilitating secure key distribution to an embedded device. In accordance with an embodiment, a manufacturer of an embedded device designates a location in the memory of the embedded device for storing a random number. The manufacturer also generates a random number, and stores the random number in the designated memory location. Subsequently, during operation of the embedded device, an embedded program on the embedded device uses the random number to obtain a security key for the embedded device. The embedded program stores the security key in the memory of the embedded device, and uses the security key to establish secure connections with other devices.

When the embedded program obtains a security key, the embedded program may write the security key over the random number in the memory of the embedded device. Alternatively, the manufacturer may write the security key to a separate location in the memory of the embedded device that does not comprise the random number.

At some point, the security key may no longer be suitable for establishing secure connections. When this occurs, the embedded program may use the security key as a new random number, which may then be used to obtain a new security key. This cycle may be repeated each time that the security key is no longer suitable for establishing secure connections and a new security key is desired. Instead of using the security key itself as a new random number, the security key may be mathematically combined with the most recently used random number (if it is still stored in memory) to generate a new random number.

FIG. 1 is a block diagram illustrating a system 100 for facilitating secure key distribution to an embedded device 102 according to an embodiment. The system 100 includes a computer 104. The computer 104 may be any device that includes a digital processor capable of receiving and processing data, such as microcontrollers, hand-held computers, personal computers, servers, mainframes, supercomputers, and any variation or related device thereof. Although a single computer 104 is shown in FIG. 1, embodiments may be practiced in systems with multiple computers 104.

The system 100 also includes an embedded device 102. The embedded device 102 is a type of computing device that may not include all the same components associated with a typical desktop computer. For example, some embedded devices 102 do not include monitors, others do not include a keyboard or a mouse, and some embedded devices 102 do not include either a monitor or a keyboard/mouse. Examples of embedded devices 102 include a vending machine, a telephone, a door lock, a temperature sensor, a motor, a switch, a light, a printer, a fax machine, a refrigerator, a health monitor, an elevator/escalator, a copier, a scanner, manufacturing equipment, industrial equipment, computer equipment and peripherals, security systems, monitoring equipment, and the like.

Embedded devices 102 will be discussed in greater detail in relation to FIG. 2. Although a single embedded device 102 is shown in FIG. 1, embodiments may be practiced in systems with multiple embedded devices 102.

The computer 104 and embedded device 102 are in electronic communication via a network 106. The term "network" as used herein refers to a system in which a series of nodes are interconnected by a communications path. A node is a physical computing device that communicates with other nodes. The specific behavior of a node is determined by the applications or software it executes. Applications running on nodes of a network communicate with each other through software modules that implement protocols, which are formalized rules for how data is sent over a network. Some protocols deal with the timing, sequencing, and error checking of data transmission. Others deal more with how the data is formatted and the commands and responses that the nodes exchange. A set of protocols that work together is called a protocol stack, with each protocol acting as a layer in the stack that is built on top of another layer. The top layer of a protocol stack is used by an application, the middle layers deal with transferring groups (packets and frames) of data between nodes, and the bottom layer deals directly with the networking hardware that transfers data.

Physical networks consist of nodes that are connected by some sort of physical medium (e.g., electrical wire, optical fiber, air). This physical connection may sometimes be referred to as a link. A physical network limited to two nodes may be referred to as point-to-point, while a physical network that may support more than two nodes may be referred to as multiple-access. Each node on a multiple-access network has a physical address that is used to distinguish it from the other nodes on the network.

Logical networks may be superimposed onto physical networks to specify a unique group of nodes. Each node in a logical network has a logical address that is mapped by a protocol to the node's physical address. A sub-network, or subnet, is a physically or logically independent portion of a network, distinguished by a subnet number.

Most protocols deal with logical networks because most physical network issues already have many well-defined implementations and defining new physical layers is not required. Logical networks also have the benefit of being insulated from the physical network, and are therefore more generally useful. For example, TCP/IP is defined on top of a logical network (IP). IP can run on many physical networks (Ethernet, serial, wireless, etc.). This makes TCP/IP a more generic solution than had it been defined only in terms of some specific physical network.

Figure 2:
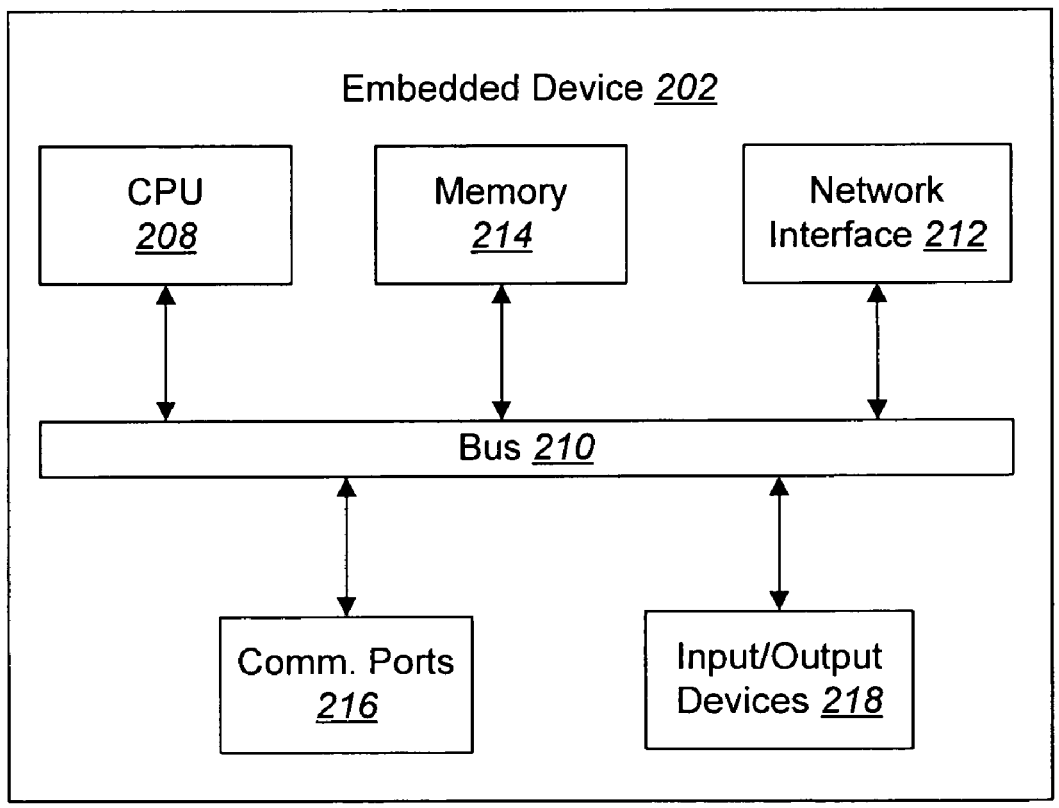
FIG. 2 is a block diagram of hardware components that may be used in an embedded device that is configured according to an embodiment.

FIG. 2 is a block diagram of hardware components that may be used in an embedded device 202 that is configured according to an embodiment. A central processing unit (CPU) 208 or processor may be provided to control the operation of the embedded device 202, including the other components thereof, which are coupled to the CPU 208 via a bus 210. The CPU 208 may be embodied as a microprocessor, microcontroller, digital signal processor or other device known in the art. The CPU 208 performs logical and arithmetic operations based on program code stored within the memory. In certain embodiments, the memory 214 may be on-board memory included with the CPU 208. For example, microcontrollers often include a certain amount of on-board memory.

The embedded device 202 may also include a network interface 212. The network interface 212 facilitates communication between the embedded device 202 and other devices connected to the network 106, which may be a pager network, a cellular network, a global communications network, the Internet, a computer network, a telephone network, etc. The network interface 212 operates according to standard protocols for the applicable network 106.

The embedded device 202 may also include memory 214. The memory 214 may include random access memory (RAM) for storing temporary data. Alternatively, or in addition, the memory 214 may include read-only memory (ROM) for storing more permanent data, such as fixed code and configuration data. The memory 214 may also be embodied as a magnetic storage device, such as a hard disk drive. The memory 214 may be any type of electronic device capable of storing electronic information.

The embedded device 202 may also include one or more communication ports 216, which facilitate communication with other devices. The embedded device 202 may also include input/output devices 218, such as a keyboard, a mouse, a joystick, a touchscreen, a monitor, speakers, a printer, etc.

Of course, FIG. 2 illustrates only one possible configuration of an embedded device 202. Various other architectures and components may be utilized.

Figure 3:
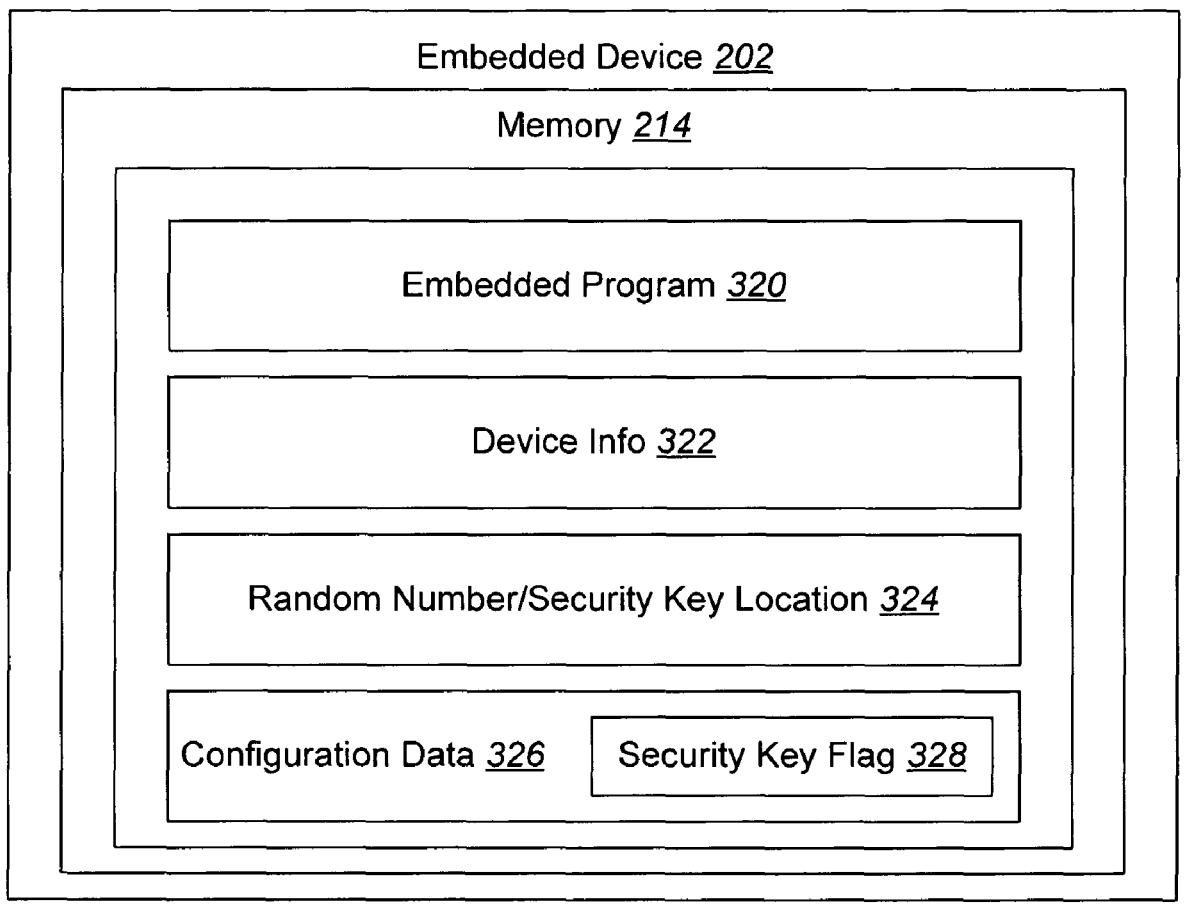
FIG. 3 is a block diagram of software components and/or data that may be stored in the memory of an embedded device that is configured according to an embodiment.

FIG. 3 is a block diagram of software components and/or data that may be stored in the memory 214 of an embedded device 202 according to an embodiment. An embedded program 320 may be stored in the memory 214. An embedded program 320 is computer software that runs the CPU 208 of an embedded device 202 and tells the CPU 208 what to do to carry out certain tasks. The embedded program 320 may be configured to facilitate security key and random number sharing, as will be explained in greater detail below. At least some of the functionality provided by the embedded program 320 may depend on the manner in which the embedded device 202 is being used.

Device-specific information 322 (i.e., information relating to the embedded device 202) may also be stored in the memory 214. Some examples of device-specific information 322 that may be stored in the memory 214 may include a serial number, a version number of the embedded program 320, a manufacture date, a user name or other user specified information, etc. At least some of the device-specific information 322 may be stored in the memory 214 by the manufacturer during the manufacturing process. Alternatively, or in addition, at least some of the device-specific information 322 may include information that is stored in the memory 214 during operation of the embedded program 320.

The memory 214 included in the embedded device 202 may also include a location 324 that is designated for alternately storing a random number and a security key. This location 324 will be referred to herein as a random number/security key location 324. The manufacturer initially stores a random number in the random number/security key location 324 at some point during the process of manufacturing the embedded device 202. At some point thereafter (typically after the manufacturer has provided the embedded device 202 to another party), the random number is used to obtain a security key. The security key is then written to the random number/secret location 324, replacing the random number. In this way, a random number may be used to obtain a security key, without the embedded device 202 itself having to generate the random number. This will be explained in greater detail below.

Configuration data 326 may also be provided in the memory 214. The configuration data 326 may include a security key flag 328. The security key flag 328 indicates whether the data that is stored in the random number/security key location 324 corresponds to a random number or a security key. In some embodiments the security key flag 328 has two possible values. If the security key flag 328 is a first value (e.g., false), then the data that is stored in the random number/security key location 324 corresponds to a random number. If the security key flag 328 is a second value (e.g., true), then the data that is stored in the random number/security key location 324 corresponds to a security key. The embedded program 320 may refer to the security key flag 328 to determine whether to obtain a security key for the embedded device 202. This will be explained in greater detail below.

Figure 4:
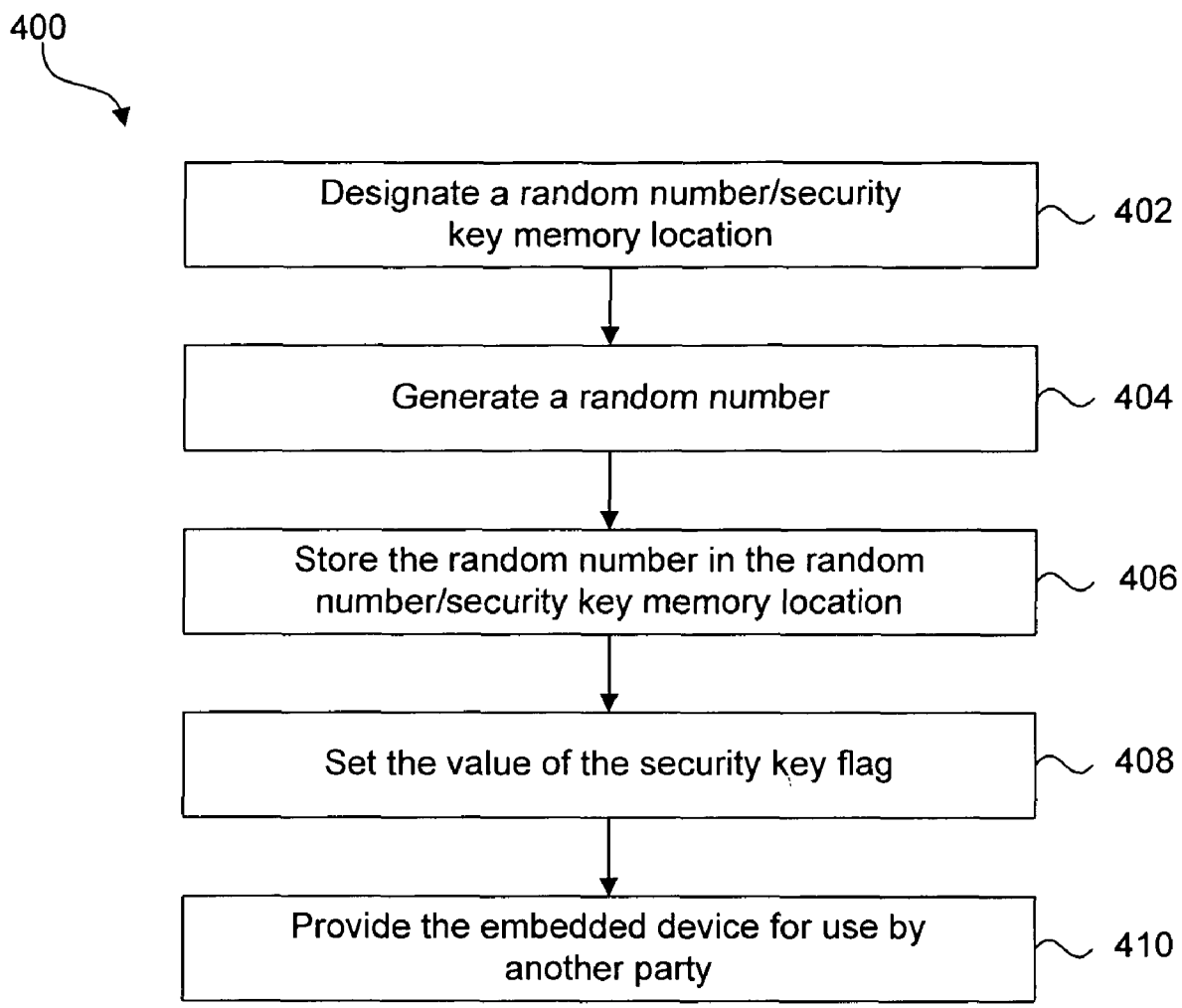
FIG. 4 is a flow diagram that illustrates how an embedded device manufacturer may manufacture an embedded device that is configured to facilitate secure key distribution according to an embodiment.

FIG. 4 is a flow diagram that illustrates how an embedded device manufacturer may manufacture an embedded device 202 that is configured to facilitate secure key distribution according to an embodiment. In accordance with the method 400, a manufacturer may designate 402 a random number/security key memory location 324, i.e., a location 324 in the memory 214 of the embedded device 202 for alternately storing a random number and a security key.

In step 404, the manufacturer generates a random number. The random number may be any desired length. Typically a longer random number provides higher security for the embedded device 202. In an exemplary embodiment the random number is 32 bytes.

In step 406, the manufacturer stores the random number that was generated in step 404 in the random number/security key memory location 324. In step 408, the manufacturer sets the value of the security key flag 328 to indicate that the data that is stored in the random number/security key location 324 corresponds to a random number.

In step 410, the manufacturer provides the embedded device 202 for use by another party. For example, the original embedded device owner may sell the embedded device 202 to another party.

Figure 5:
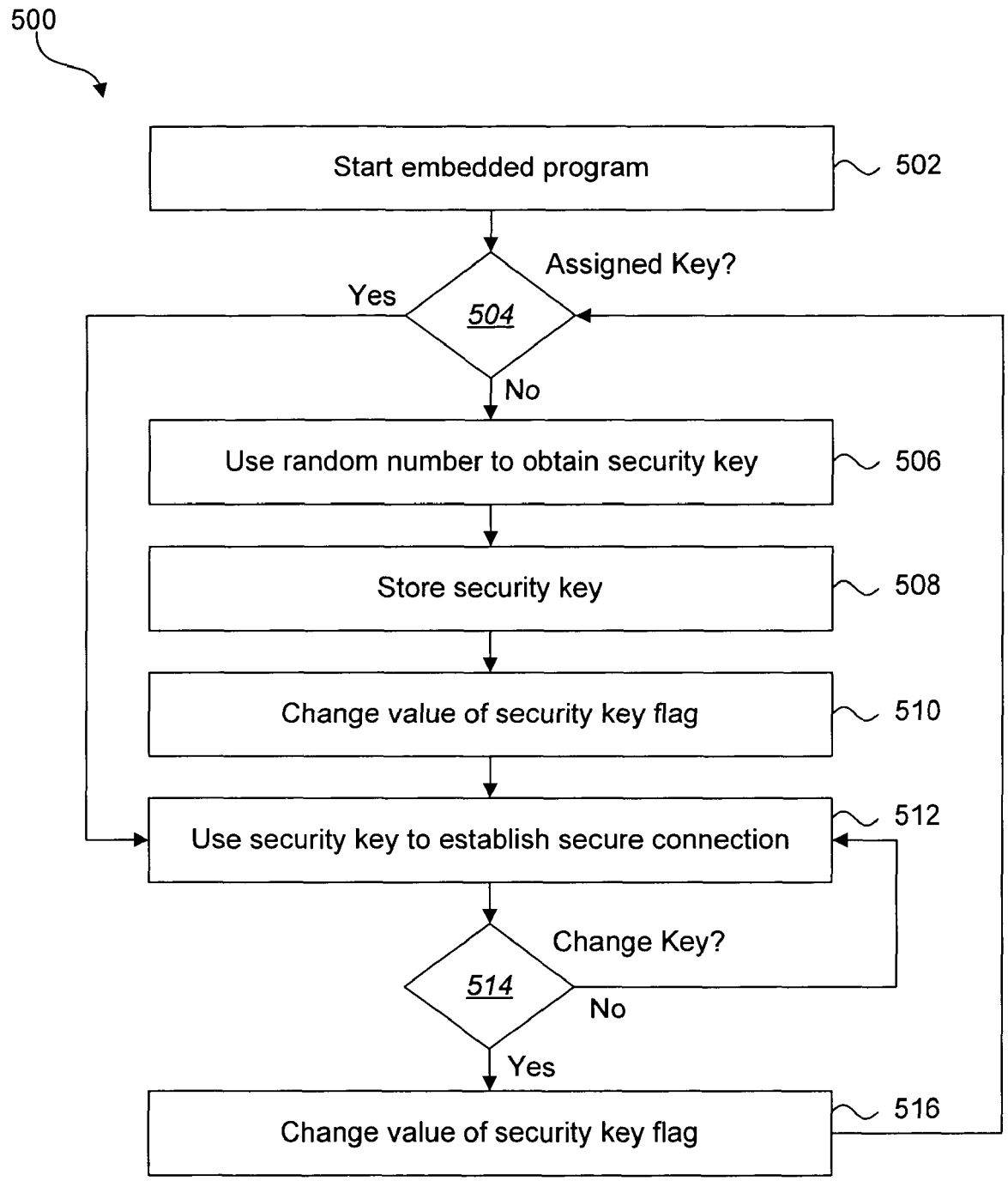
FIG. 5 is a flow diagram that illustrates the operation of an embedded device program that facilitates secure key distribution according to an embodiment.

FIG. 5 is a flow diagram that illustrates the operation of an embedded device program 320 that facilitates secure key distribution to the embedded device 202 according to an embodiment. In step 502, the embedded program 320 in the memory 214 of the embedded device 202 is started.

In step 504, the embedded program 320 determines whether a security key has been assigned to the embedded device 202. In some embodiments, the determination of whether a security key has been assigned is made by determining the value of the security key flag 328 stored in the configuration data 326. As described above, the security key flag 328 indicates information about whether the data that is stored in the random number/security key location 324 corresponds to a random number or a security key. If the value of the security key flag 328 indicates that the data corresponds to a security key, then a security key has been assigned to the embedded device 202. However, if the value of the security key flag 328 indicates that the data corresponds to a random number, then a security key has not been assigned to the embedded device 202.

If it is determined that a security key has not been assigned to the embedded device 202, then in step 506 the embedded program 320 uses the random number in the random number/security key location 324 of the memory 214 of the embedded device 202 to obtain a security key. As indicated above, this random number may be provided by a manufacturer of the embedded device 202. A variety of key distribution methods may be used in accordance with embodiments disclosed herein. Using the Secure Remote Password (SRP) protocol as an example, the embedded program 320 may request a low-entropy password from the user. The embedded program 320 may use this password in combination with the random number provided by the manufacturer to establish a secure connection with a key generator. The embedded device 202 may then request a key, passing its identity. The key generator may assign a key to the embedded device 202 and distribute that key to the embedded device 202 over the secure connection. The key generator may remember the assigned security key along with the identity of the embedded device 202.

Although the SRP protocol was provided as an example, embodiments are not limited to any specific key distribution method. Any other method that uses a random number during the process of security key distribution may be used in embodiments disclosed herein. For example, public or private key encryption may be used.

In step 508, the embedded program 320 stores the security key. The embedded program 320 may store the security key in the random number/security key location 324 of the embedded device 202, overwriting the random number that was previously stored there. Alternatively, as will be explained in greater detail below, the embedded program 320 may write the security key to a memory location that does not comprise the random number, i.e., that is separate from the memory location that stores the random number. In step 510, the embedded program 320 changes the value of the security key flag 328 to indicate that a security key has been assigned to the embedded device 202.

If in step 504 it is determined that a security key has been assigned to the embedded device 202, then the method 500 proceeds directly to step 512. In step 512, the embedded program 320 uses its assigned security key to establish secure connections with other devices.

From time to time, it may be desirable to provide a new security key for the embedded device 202. For example, the embedded device 202 may be relocated (e.g., sold from one owner to another). As another example, the current security key may have been compromised.

In step 514, the embedded program 320 determines whether the user wants to change the security key. If the user does not want to change the security key, the embedded program 320 may continue to use 512 the security key to establish secure connections. However, if at any point it becomes desirable to provide a new security key for the embedded device 202, then the embedded program 320 may discontinue to use the security key to establish secure connections with other devices. To reflect the fact that the data in the random number/security key location 324 is no longer being used as a security key, in step 516 the value of the security key flag 328 is changed to indicate that a security key has not been assigned to the embedded device 202. The data in the random number/security key location 324 itself has not changed at this point; rather, when the security key flag 328 is changed 516 the embedded program 320 simply starts to treat the data as a random number instead of a security key. This works because a security key is a secret value, and a general principle of secrets is that they are ideally just random bit patterns. The method then returns to step 504, and in step 504 the "new" random number (the previous security key) may then be used to obtain a new security key. This process may be repeated each time that it becomes desirable to provide the embedded device 202 with a new security key.

Figure 6:
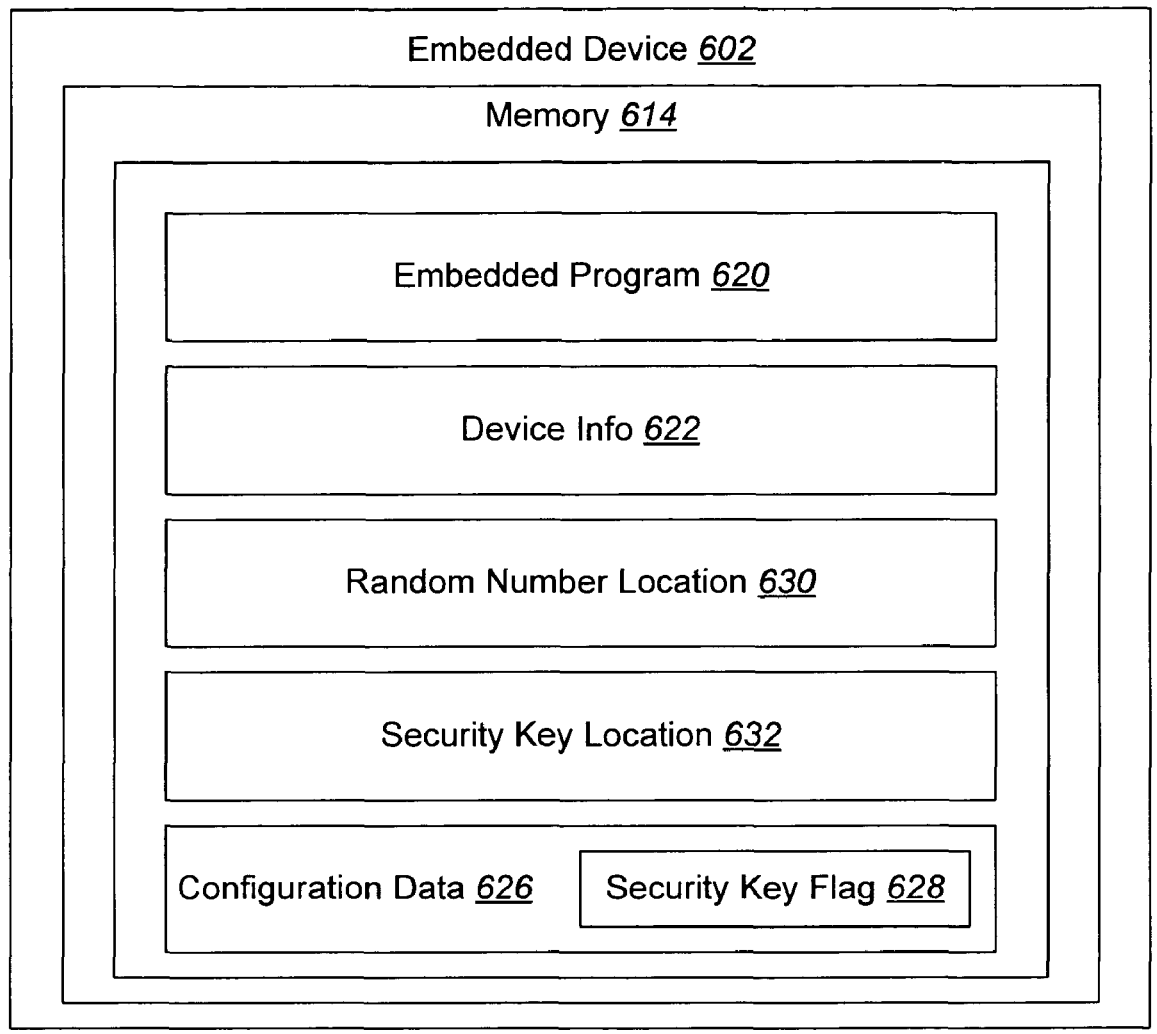
FIG. 6 is a block diagram of software components and/or data that may be stored in the memory of an embedded device according to another embodiment.

FIG. 6 is a block diagram of software components and/or data that may be stored in the memory 614 of an embedded device 602 according to another embodiment. As with the embodiment described previously, the memory 614 shown in FIG. 6 includes an embedded program 620, device-specific information 622, and configuration data 626. Also, the configuration data includes a security key flag 628.

In the embodiment shown in FIG. 3, the memory 214 includes a single random number/security key location 324. In contrast, in the embodiment shown in FIG. 6, the memory 614 includes a location 630 for a random number, and a separate location 632 for the security key. In this context, the term "separate" simply means that a random number and a security-key may be stored in the memory 614 of the embedded device 602 at the same time. The random number location 630 and the security key location 632 may be positioned adjacent to one another, or they may be positioned apart from one another.

In the illustrated embodiment, when the random number is used to obtain a security key, the security key that is obtained does not have to be written to the same memory location as the random number. Instead, both the random number and the security key may be stored in the memory of the embedded device 602 at the same time. In such embodiments, when it is desired to provide a new security key, the current random number and the current security key may be combined to generate a new random number. The new random number may then be used to obtain a new security key.

In addition to the techniques disclosed above, other techniques may be used to obtain a new security key for an embedded device 202. For example, the original random number from the manufacturer may be used as a seed for generating a longer random number (i.e., sequence of random bits).

Figure 7:
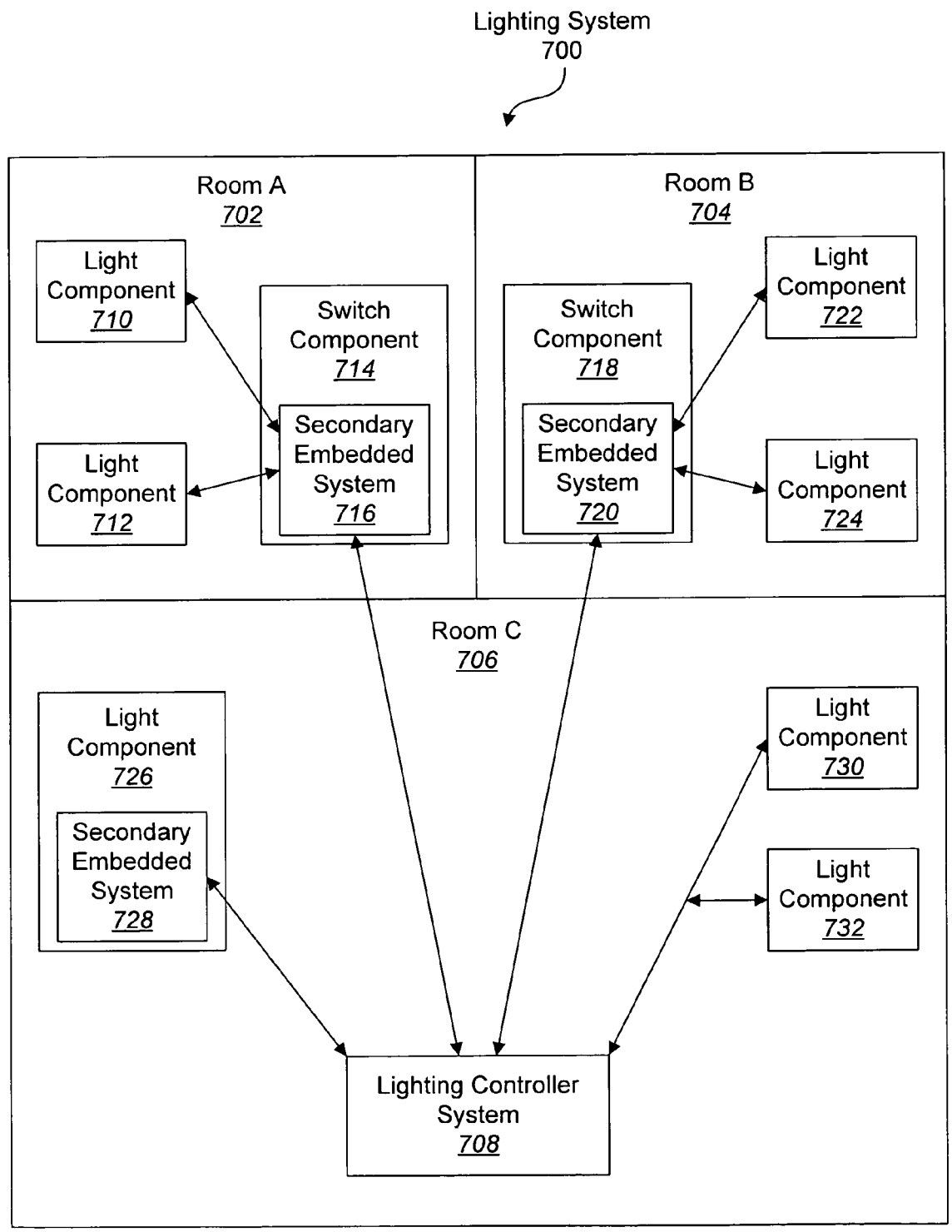
FIG. 7 illustrates an exemplary lighting system in which the present systems and methods may be implemented.

The present systems and methods may be used in several contexts. FIG. 7 illustrates one embodiment of a system wherein the present systems and methods may be implemented. FIG. 7 is a block diagram that illustrates one embodiment of a lighting system 700 that includes a lighting controller system 708. The lighting system 700 of FIG. 7 may be incorporated in various rooms in a home. As illustrated, the system 700 includes a room A 702, a room B 704, and a room C 706. Although three rooms are shown in FIG. 7, the system 700 may be implemented in any number and variety of rooms within a home, dwelling, or other environment.

The lighting controller system 708 may monitor and control additional embedded systems and components within the system 700. In one embodiment, the room A 702 and the room B 704 each include a switch component 714, 718. The switch components 714, 718 may also include a secondary embedded system 716, 720. The secondary embedded systems 716, 720 may receive instructions from the lighting controller system 708. The secondary embedded systems 716, 720 may then execute these instructions. The instructions may include powering on or powering off various light components 710, 712, 722, and 724. The instructions may also include dimming the brightness or increasing the brightness of the various light components 710, 712, 722, and 724. The instructions may further include arranging the brightness of the light components 710, 712, 722, and 724 in various patterns. The secondary embedded systems 716, 720 facilitate the lighting controller system 708 to monitor and control each light component 710, 712, 722, and 724 located in the room A 702 and the room B 704.

The lighting controller system 708 might also provide instructions directly to a light component 726 that includes a secondary embedded system 728 in the depicted room C 706. The lighting controller system 708 may instruct the secondary embedded system 728 to power down or power up the individual light component 726. Similarly, the instructions received from the lighting controller system 708 may include dimming the brightness or increasing the brightness of the individual light component 726.

The lighting controller system 708 may also monitor and provide instructions directly to individual light components 730 and 732 within the system 700. These instructions may include similar instructions as described previously.

Figure 8:
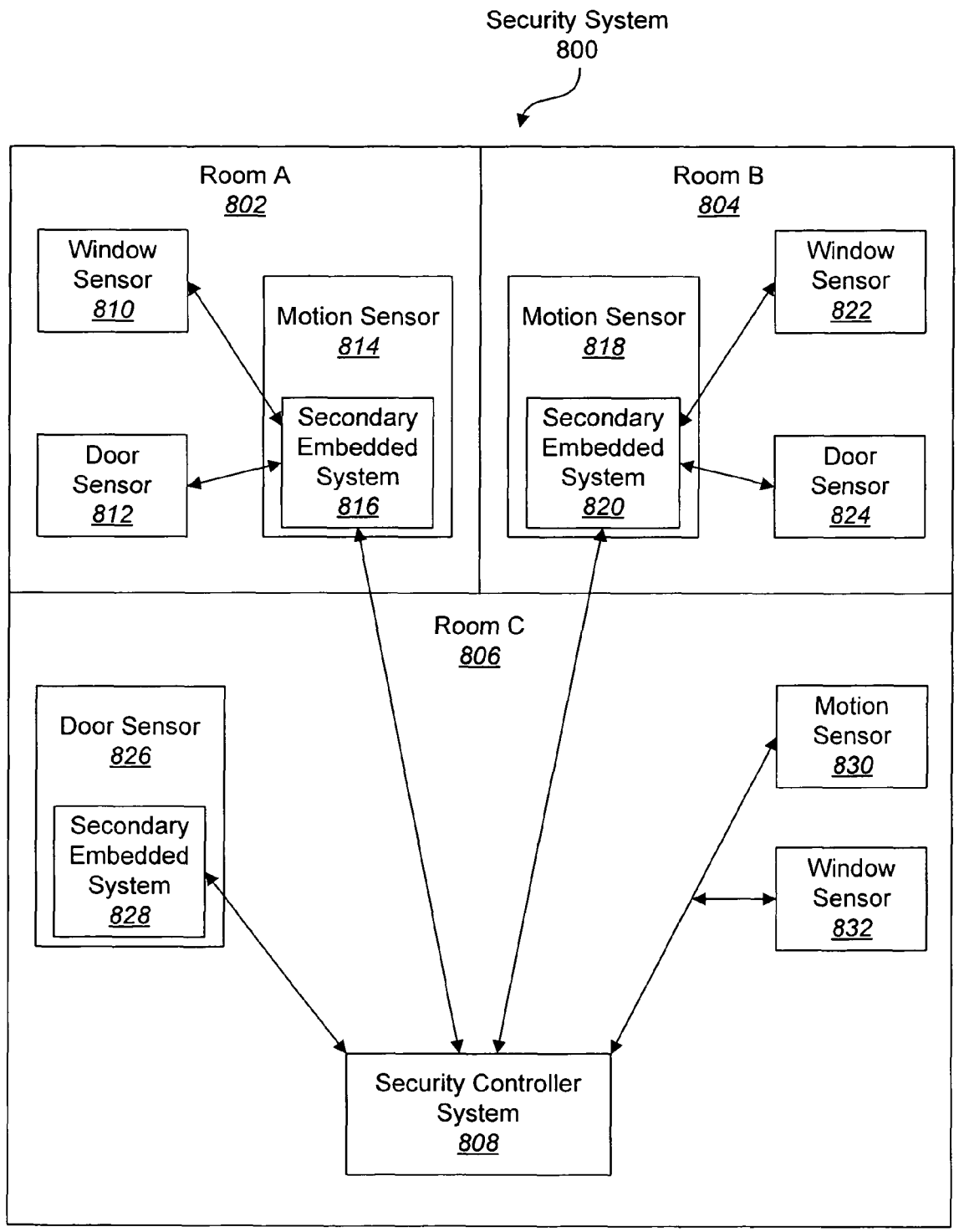
FIG. 8 illustrates an exemplary security system in which the present systems and methods may be implemented.

FIG. 8 is an additional embodiment of a system wherein the present systems and methods of the present invention may be implemented. FIG. 8 is a block diagram illustrating a security system 800. The security system 800 in the depicted embodiment is implemented in a room A 802, a room B 804, and a room C 806. These rooms may be in the confines of a home or other enclosed environment. The system 800 may also be implemented in an open environment where the rooms A, B and C, 802, 804, and 806 respectively represent territories or boundaries.

The system 800 includes a security controller system 808. The security controller system 808 monitors and receives information from the various components within the system 800. For example, a motion sensor 814, 818 may include a secondary embedded system 816. The motion sensors 814, 818 may monitor an immediate space for motion and alert the security controller system 808 when motion is detected via the secondary embedded system 816, 820. The security controller system 808 may also provide instructions to the various components within the system 800. For example, the security controller system 808 may provide instructions to the secondary embedded systems 816, 820 to power up or power down a window sensor 810, 822 and a door sensor 812, 824. In one embodiment, the secondary embedded systems 816, 820 notify the security controller system 808 when the window sensors 810, 822 detect movement of a window. Similarly, the secondary embedded systems 816, 820 notify the security controller system 808 when the door sensors 812, 824 detect movement of a door. The secondary embedded systems 816, 820 may instruct the motion sensors 814, 818 to activate the LED (not shown) located within the motion sensors 814, 818.

The security controller system 808 may also monitor and provide instructions directly to individual components within the system 800. For example, the security controller system 808 may monitor and provide instructions to power up or power down to a motion sensor 830 or a window sensor 832. The security controller system 808 may also instruct the motion sensor 830 and the window sensor 832 to activate the LED (not shown) or audio alert notifications within the sensors 830 and 832.

Each individual component comprising the system 800 may also include a secondary embedded system. For example, FIG. 8 illustrates a door sensor 826 including a secondary embedded system 828. The security controller system 808 may monitor and provide instructions to the secondary embedded system 828 in a similar manner as previously described.

Figure 9:
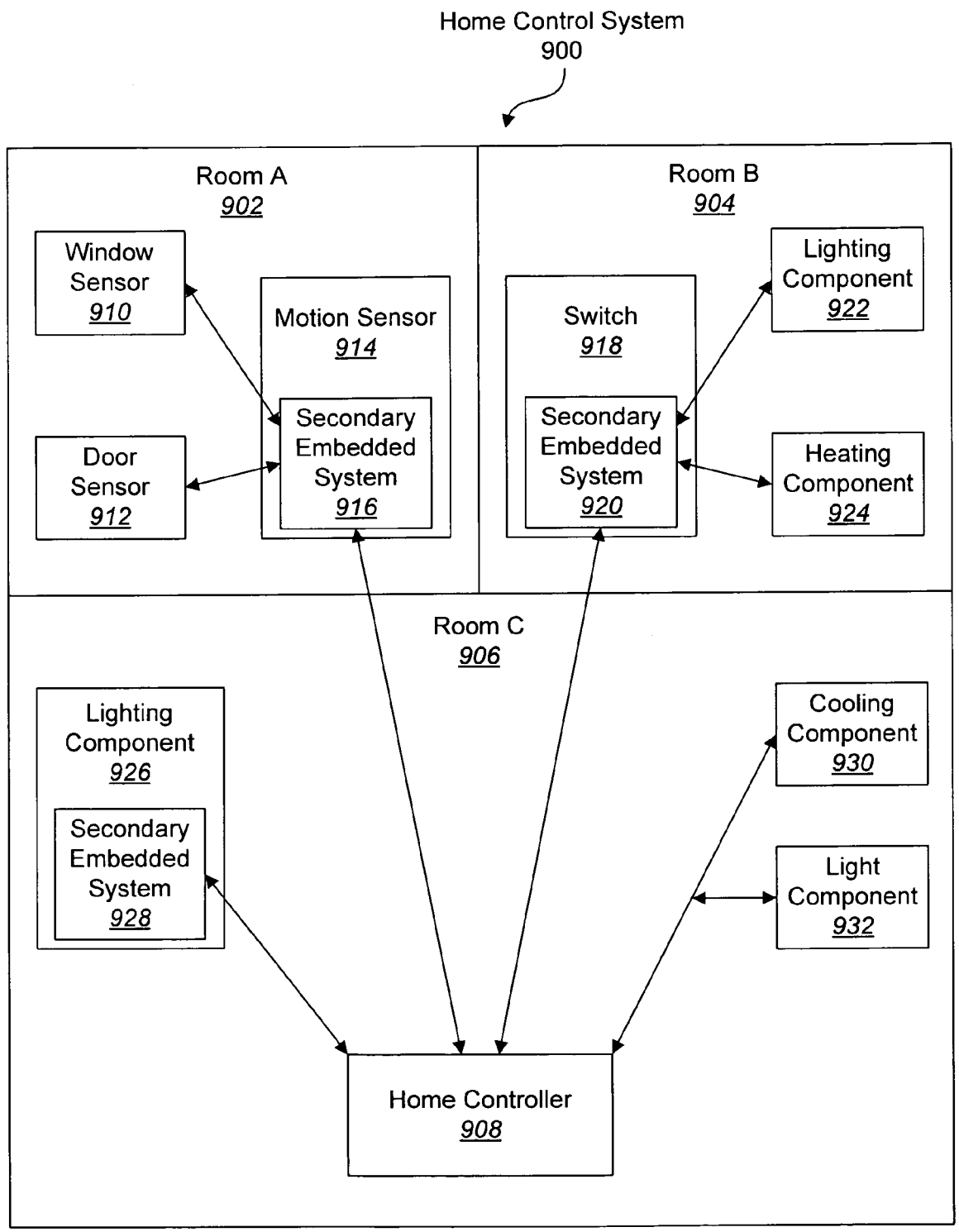
FIG. 9 illustrates an exemplary home controller system in which the present systems and methods may be implemented.

FIG. 9 is a block diagram illustrating one embodiment of a home control system 900. The home control system 900 includes a home controller 908 that facilitates the monitoring of various systems such as the lighting system 700, the security system 800, and the like. The home control system 900 allows a user to control various components and systems through one or more embedded systems. In one embodiment, the home controller system 908 monitors and provides information in the same manner as previously described in relation to FIGS. 7 and 8. In the depicted embodiment, the home controller 908 provides instructions to a heating component 924 via a secondary embedded system 920. The heating component 924 may include a furnace or other heating device typically found in resident locations or offices. The home controller system 908 may provide instructions to power up or power down the heating component 924 via the secondary embedded system 920.

Similarly, the home controller 908 may monitor and provide instructions directly to a component within the home control system 900 such as a cooling component 930. The cooling component 930 may include an air conditioner or other cooling device typically found in resident locations or offices. The central home controller 908 may instruct the cooling component 930 to power up or power down depending on the temperature reading collected by the central embedded system 908. The home control system 900 functions in a similar manner as previously described in relation to FIGS. 7 and 8.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for facilitating secure key distribution to an embedded device, the method being implemented by an embedded program on the embedded device, the method comprising:
   determining whether it is necessary to change a security key that was not generated by the embedded device, if not, continuing to use the security key to establish secure connections,
   if it is determined to be necessary to change the security key,
   discontinuing use of the security key to establish secure connections and subsequently using the security key as a new random number to obtain a new security key;
   determining whether the security key has been assigned to the embedded device by determining a value of a security key flag stored in the embedded device;
   if the security key has not been assigned:
      using a random number that is provided by a manufacturer of the embedded device and that is stored in memory of the embedded device to obtain the security key for the embedded device as the new security key; and
      storing the new security key by writing the new security key into the memory of the embedded device over the random number.

2. The method of claim 1, further comprising using the random number as a seed for generating a longer random number.

3. The method of claim 1, wherein the security key flag is stored in configuration data of the embedded device.

4. An embedded device that is configured to facilitate secure key distribution, the embedded device comprising:
   a processor;
   memory in electronic communication with the processor;
   instructions stored in the memory, the instructions being executable to:
      determine whether it is necessary to change a security key that was not generated by the embedded device, if not, continuing to use the security key to establish secure connections,
      if it is determined to be necessary to change the security key,
      discontinue use of the security key to establish secure connections and subsequently use the security key as a new random number to obtain a new security key;
      determine whether the security key has been assigned to the embedded device by determining a value of a security key flag stored in the embedded device;
      if the security key has not been assigned:
         use a random number that is provided by a manufacturer of the embedded device and that is stored in memory of the embedded device to obtain the security key for the embedded device as the new security key; and
         store the new security key by writing the new security key into the memory of the embedded device over the random number.

5. The embedded device of claim 4, wherein the instructions are further executable to use the random number as a seed for generating a longer random number.

6. The embedded device of claim 4, wherein the security key flag is stored in configuration data of the embedded device.

7. A method for manufacturing an embedded device that is configured to facilitate secure key distribution, comprising:
   providing memory for an embedded device;
   designating a location in the memory of the embedded device for storing a random number;
   generating the random number;
   storing the random number in the designated location of the memory of the embedded device;
   providing an embedded program that is configured to determine whether a security key has been assigned to the embedded device by determining a value of a security key flag stored in the embedded device, and if the security key has not been assigned, to use the random number in the designated location of the memory of the embedded device to obtain the security key for the embedded device; and
   storing the embedded program in the memory of the embedded device by writing the security key over the random number in the memory of the embedded device, wherein the embedded program is also configured to:
      determine whether it is necessary to change the security key that was not generated by the embedded device, if not, continuing to use the security key to establish secure connections,
      if it is determined to be necessary to change the security key,
      discontinue use of the security key to establish secure connections and subsequently use the security key as a new random number to obtain a new security key.

8. The method of claim 7, further comprising storing configuration data in the memory, wherein the configuration data comprises the security key flag that indicates whether the security key has been assigned to the embedded device.

* * * * *

UNITED STATES PATENT AND TRADEMARK OFFICE
CERTIFICATE OF CORRECTION

PATENT NO. : 7,894,606 B2  
APPLICATION NO. : 11/287886  
DATED : February 22, 2011  
INVENTOR(S) : Bryant Eastham Page 1 of 1

It is certified that error appears in the above-identified patent and that said Letters Patent is hereby corrected as shown below:

In column 9, line 66 please delete "security-key" and replace it with --security key--.
In column 11, line 45 please delete "home: control" and replace it with --home control--.

Signed and Sealed this  
Fifth Day of July, 2011

David J. Kappos  
*Director of the United States Patent and Trademark Office*